Dec. 10, 1963
R. N. JOHNSON
3,113,677
MUG HOLDER
Filed July 10, 1961
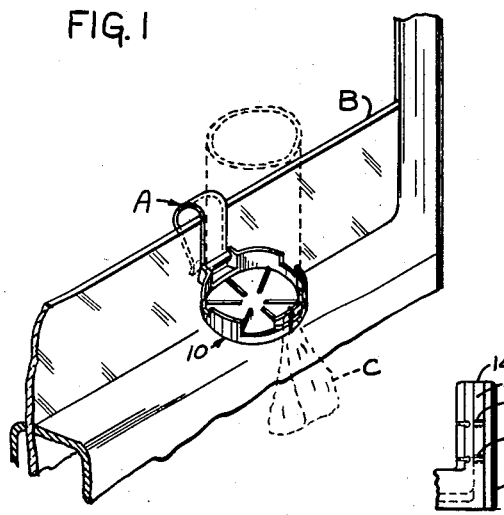
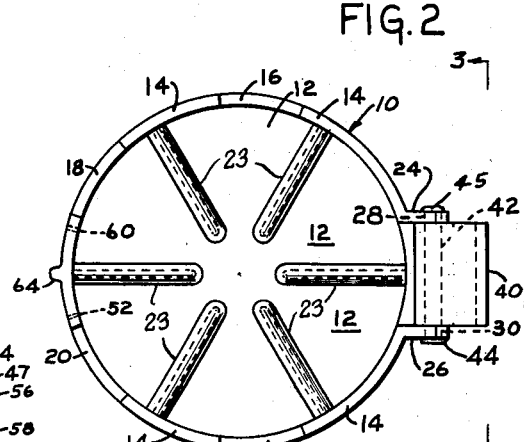
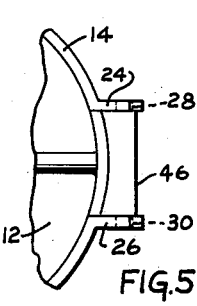
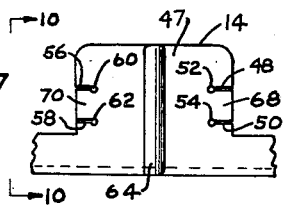
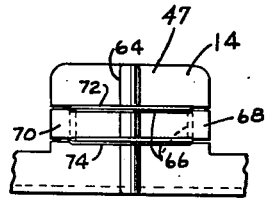
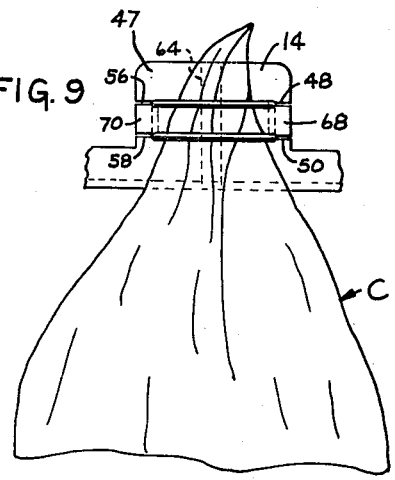
INVENTOR
REUBEN N. JOHNSON
BY
Caswell, Lagaard & Wicks
ATTORNEYS

United States Patent Office 3,113,677
Patented Dec. 10, 1963

3,113,677
MUG HOLDER
Reuben N. Johnson, 1101 Wilson St., Onalaska, Wis.
Filed July 10, 1961, Ser. No. 123,410
1 Claim. (Cl. 211—88)

The invention relates to an improvement in article holders and more particularly to a tray-like device for holding a drinking glass or mug which is adapted to be supported on the edge of a partially lowered window of an automobile.

This invention is an improvement over my application Serial No. 70,276, filed November 18, 1960, now U.S. Patent No. 3,036,717, granted May 29, 1962.

It is an object of the invention to provide a holder for a drinking glass or mug which may be hung on the upper edge of the window glass of an automobile. It is a further object to provide a holder having window engaging means which may be moved from a window engaging position to a position whereby the same is substantially within the confines of the holder in a folded position out of the way. This construction aids considerably in storage and shipping of the holder.

It is a still further object to provide a holder having means for attaching a napkin thereto.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of the application:

FIGURE 1 is a perspective view of the holder mounted on the upper edge of a window of an automobile with a drinking mug and napkin shown in broken lines.

FIGURE 2 is an enlarged top plan view of the holder.

FIGURE 3 is a rear elevational view with the hook member removed.

FIGURE 4 is a side elevational view with hook member shown in folded position in broken lines.

FIGURE 5 is a fragmentary top plan view of the rear portion of the holder with the hook removed.

FIGURE 6 is an enlarged perspective view of the hook member removed from the holder.

FIGURE 7 is a front elevational view of a portion of the body of the holder forming part of the napkin holder means.

FIGURE 8 is a view similar to FIGURE 7 with the napkin holder means complete.

FIGURE 9 is a view similar to FIGURE 7 with a napkin holder in place.

FIGURE 10 is an elevational view on the line 10—10 of FIGURE 7.

Referring to the drawings in detail, the letter A designates the holder which includes the main cylindrical body portion 10. The body portion 10 is composed of the substantially flat circular bottom 12 formed with the shallow upright peripheral wall 14. The wall 14 is formed with the recesses 16, 18, 20 and 22 which receive the handle of a mug placed on the holder A. The recess selected by the user depends on which side of the automobile the holder is placed and also the preference for the position of the mug handle for use by the occupants of the automobile. The bottom 12 has formed on the upper surface thereof the radially extending upstanding ribs 23 which maintain the bottom of the glass or mug elevated above the bottom and thus allow drainage of moisture from the outer surface of the mug.

The body portion 10 also includes the vertical spaced flanges 24 and 26 extending from the wall 14 each of which is formed with a pin-receiving hole 28 and 30, respectively. Further provided, is the hook member 32 including the base wall portion 34. The wall portion 34 of the hook member 32 has formed on the outer face thereof and adjacent the lower edge thereof the transverse lug portion 36 which has extending therethrough the pin-receiving hole 38. Extending from the upper edge of the wall portion 34 is the arcuate hook end portion 40 which together with the wall portion 34 forms the hook member 32 which may be hung on the upper edge of an automobile window. The hook member 32 is positioned so that the pin hole 38 of the lug 36 is opposite the holes 28 and 30 of the flanges 24 and 26 whereby the pin 42 may be inserted therethrough to hingedly mount the hook 32 on the holder body 10. The pin has a head portion 44 and may be secured in place by a nut on the opposite end or riveted at 45 as shown.

With the hook member 32 hingedly mounted, as set forth, the same may be placed in the position shown in broken lines in FIGURE 4 where it is within the confines of the peripheral wall 14 allowing a compactness for storage and shipment. This is due to the fact there is a void in the wall 14 between the flanges 24 and 26. The holder A is used by placing the hook member 32 in the position shown in FIGURE 1, and slipping it over the upper edge of an automobile window such as B.

The hook 32 is maintained in its position relative to the body 10, as in FIGURE 4, as a result of the lower edge of the wall 34 contacting the shoulder 46 which extends outwardly from the bottom 12. As a result the body 10 may be maintained in a relatively horizontal position although the window is angularly disposed. By reducing the width of the shoulder 46 the hook 32 may be caused to maintain a position closer to the vertical.

Further provided in a segment 47 of the wall 14 at the edge thereof are a pair of horizontal spaced slots 48 and 50 each of which terminate in a small hole 52 and 54, respectively. A further and similar pair of spaced slots 56 and 58 are formed in the wall segment each terminating in a smoll hole 60 and 62, respectively. A vertical ridge 64 is formed on the outward surface of the wall segment 47. A small rubber band 66 is provided which is slipped into each pair of slots 52 and 54 and also 56 and 58 with the ends thereof around the portions 68 and 70 formed between the pairs of slots. The strands 72 and 74 of the rubber band 66 are urged upon the ridge 64 which aids in maintaining a napkin, such as C, in place as illustrated in FIGURE 9.

The invention is not to be understood as restricted to the details set forth since these may be modified within the scope of the appended claims without departing from the spirit and scope of the invention.

Having thus described the invention, what is claimed as new and desired to be secured by Letters Patent is:

In a tray for connection with a substantially upright member, a body member having a bottom and a peripheral wall portion, said wall portion having a void therein, a hook member pivotally connected to said body portion and adapted to be rotated through said void and onto said bottom, shoulder means limiting the rotative movement of said hook member relative to said body member, a pair of spaced slot means formed in said wall portion, and a resilient member engaged in said pair of slot means and upon said wall for pressing engagement with an object against said wall when placed under said resilient member and upon said wall.

References Cited in the file of this patent

UNITED STATES PATENTS

| | | |
|---|---|---|
| 853,383 | Thoms | May 14, 1907 |
| 946,341 | Dooley | Jan. 11, 1910 |
| 1,288,560 | Gordon | Dec. 24, 1918 |
| 2,459,246 | Sinclair | Jan. 18, 1949 |
| 2,741,521 | Bell et al. | Apr. 10, 1956 |

FOREIGN PATENTS

| | | |
|---|---|---|
| 462,313 | Great Britain | Mar. 8, 1937 |